US012033579B1

(12) United States Patent
Zhou et al.

(10) Patent No.: US 12,033,579 B1
(45) Date of Patent: Jul. 9, 2024

(54) PIXEL DRIVE CIRCUIT, RESISTANCE COMPENSATION METHOD AND DISPLAY PANEL

(71) Applicant: HKC CORPORATION LIMITED, Shenzhen (CN)

(72) Inventors: Mancheng Zhou, Shenzhen (CN); Yuanping Zhang, Shenzhen (CN); Haijiang Yuan, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/344,778

(22) Filed: Jun. 29, 2023

(30) Foreign Application Priority Data

Dec. 26, 2022 (CN) ......................... 202211673145.9

(51) Int. Cl.
*G09G 3/3233* (2016.01)

(52) U.S. Cl.
CPC ... *G09G 3/3233* (2013.01); *G09G 2300/0452* (2013.01); *G09G 2300/0819* (2013.01); *G09G 2300/0842* (2013.01); *G09G 2320/045* (2013.01)

(58) Field of Classification Search
CPC ......... G09G 3/3233; G09G 2300/0452; G09G 2300/0819; G09G 2300/0842; G09G 2320/045
See application file for complete search history.

(56) References Cited

U.S. PATENT DOCUMENTS

| | | | | |
|---|---|---|---|---|
| 2002/0011976 A1* | 1/2002 | Hashimoto | G09G 3/3233 345/76 |
| 2015/0200241 A1* | 7/2015 | Kim | G09G 3/3233 257/40 |
| 2016/0098958 A1* | 4/2016 | Kang | G09G 3/3208 345/78 |
| 2018/0268753 A1 | 9/2018 | Wang et al. | |
| 2019/0005877 A1 | 1/2019 | Dong | |
| 2021/0375201 A1* | 12/2021 | Park | G09G 3/3233 |
| 2022/0344430 A1* | 10/2022 | Zhou | G09G 3/3233 |

FOREIGN PATENT DOCUMENTS

| | | |
|---|---|---|
| CN | 105825803 A | 8/2016 |
| CN | 105845081 A | 8/2016 |
| CN | 109584793 A | 4/2019 |
| CN | 110047436 A | 7/2019 |
| CN | 111627996 A | 9/2020 |
| CN | 112951158 A | 6/2021 |
| CN | 113744692 A | 12/2021 |
| CN | 115116376 A | 9/2022 |
| JP | 2005062382 A | 3/2005 |

* cited by examiner

*Primary Examiner* — Premal R Patel
(74) *Attorney, Agent, or Firm* — Franklin & Associates International Inc; Matthew F. Lambrinos

(57) ABSTRACT

A pixel drive circuit, a resistance compensation method and a display panel are disclosed, wherein the compensation circuit in the pixel drive circuit is configured to compensate the resistance from the data line to the control end of the drive switch, so that the resistance of the data line to the control end of the drive switch in different pixel rows tend to be consistent, thus the efficiency of the same data line when charging the pixels in the pixel row at the far end is consistent with the efficiency at the near end.

15 Claims, 4 Drawing Sheets

PIXEL DRIVE CIRCUIT, RESISTANCE COMPENSATION METHOD AND DISPLAY PANEL

CROSS-REFERENCE TO RELATED APPLICATIONS

This application claims the priority to the Patent Application No. 202211673145.9, entitled "Pixel Drive Circuit, Resistance Compensation Method, and Display Panel", filed on Dec. 26, 2022, in the State Intellectual Property Office of the People's Republic of China, the disclosure of which is incorporated herein by reference in its entirety.

FIELD

The present application generally relates to the field of display panel technology, and more specifically to a pixel drive circuit, a resistance compensation method, and a display panel.

BACKGROUND

Organic Light-Emitting Diode (OLED), is also known as Organic Electroluminesence Display (OELD). OLED display is thinner and lighter than Liquid Crystal Display (LCD). OLED display has high brightness, low power consumption, fast response, high contrast, wide color gamut, wide viewing angle, but has no backlight, so it can be ultra-thin. Therefore, it is favored by consumers.

At present, OLED display panels have multiple pixel rows, wherein each pixel row includes multiple sub-pixels, each column of data lines is connected to multiple pixel rows, and the data lines are connected to a driver IC (Driver IC) to drive each pixel row row-by-row. Because the length of the data line is different, the resistance value from the data line to each pixel row is different too, that is, if the impedance from the data line near and away from the Driver IC end to the pixel row is defined as Re1 and Ren in turn, Ren then is greater than Re1, and the efficiency of the same data line charging the pixels in the pixel row at the far end will be lower than that at the near end, resulting in uneven display brightness of the display panel and affecting the display effect.

SUMMARY

In a first aspect, the present application provides a pixel drive circuit, the pixel drive circuit comprises: a switch circuit, a storage circuit, a connection circuit and a compensation circuit, wherein:

- the switch circuit is provided with a drive switch, a control end of the drive switch is connected to the compensation circuit, an input end of the drive switch is connected to the data line and the power supply voltage, and an output end of the drive switch is connected to the connection circuit and the pixel;
- the connection circuit is connected to the compensation circuit and is configured to transmit the data voltage to the storage circuit when the switch circuit transmits the data voltage output by the data line, and the storage circuit is configured to, after receiving the data voltage, output the data voltage to the control end of the drive switch, so that the drive switch drives the pixel to emit light according to the power supply voltage; and
- the compensation circuit is configured to compensate the resistance from the data line to the control end of the drive switch.

In a second aspect, the present application also provides a resistance compensation method, the resistance compensation method comprises:

- obtaining the resistance value from the data line to each pixel row, and determining the highest resistance value;
- calculating a compensation resistance corresponding to each pixel row based on the highest resistance value and the resistance value of each pixel row; and
- providing a compensation circuit in a drive circuit corresponding to a pixel in each pixel row according to the compensation resistor corresponding to each pixel row.

In a third aspect, the present application also provides a display panel, the display panel comprises: a plurality of pixel rows and a plurality of pixel columns, each of the pixel rows and the pixel columns is composed of a plurality of pixels, and the pixels of at least one of the pixel rows are driven to emit light by a pixel drive circuit, and the pixel drive circuit includes: a switch circuit, a storage circuit, a connection circuit and a compensation circuit, wherein:

- the switch circuit is provided with a drive switch, the control end of the drive switch is connected to the compensation circuit, the input end of the drive switch is connected to the data line and the power supply voltage, and the output end of the drive switch is connected to the connection circuit and the pixels;
- the connection circuit is connected to the compensation circuit and is configured to transmit the data voltage to the storage circuit when the switch circuit transmits the data voltage output by the data line, wherein the storage circuit is configured to, after receiving the data voltage, output the data voltage to the control end of the drive switch, so that the drive switch drives the pixel to emit light according to the power supply voltage; and
- the compensation circuit is configured to compensate the resistance from the data line to the control end of the drive switch.

The pixel drive circuit provided in the embodiment of the present application, wherein the compensation circuit in the pixel drive circuit is configured to compensate the resistance value from the data line to the control end of the drive switch, so that the resistance values of the data lines to the control end of the drive switches in different pixel rows tend to be consistent, thus achieving the effect that the efficiency of the same data line, when charging the pixels in the pixel rows at the far end, is consistent with that at the near end, which can make the display brightness of the pixels in the pixel row more even. When the pixel display brightness of the pixel row is more even, the overall display brightness of the display panel can be more even, thereby improving the brightness uniformity of the display panel and user experience, and avoiding the problems that the efficiency of the same data line charging the pixels in the pixel row at the far end is lower than that at the near end, resulting in uneven display brightness of the display panel and affecting the display effect.

EXPLANATION OF REFERENCE NUMBERS

1-switch circuit; 11-drive switch; 2-storage circuit; 3-connection circuit; 31-first thin film transistor; 4-compensation circuit; 5-pixel; C-storage capacitor; A-target connection node; 111-processor; 112-communication interface; 113-memory; 114-communication bus.

DETAILED DESCRIPTION

In order to more clearly illustrate the technical solutions of the embodiments of the present application, the specific implementation of the present application will be described below with reference to the accompanying drawings. Apparently, the accompanying drawings in the following description are only some embodiments of the present application, and those skilled in the art can obtain other accompanying drawings based on these drawings without any creative effort, and obtain other implementations.

For the sake of brevity, each figure only schematically shows the parts relevant to the application, and they do not represent the actual structure of the product. In addition, to make the drawings concise and easy to understand, in some drawings, only one of the components having the same structure or function is schematically drawn, or only one of them is marked. In this article, “a/an/one” not only means “only one”, but also can mean “a plurality of”.

The application will be described in further detail below in conjunction with the accompanying drawings and embodiments.

An Embodiment

Figure 1:
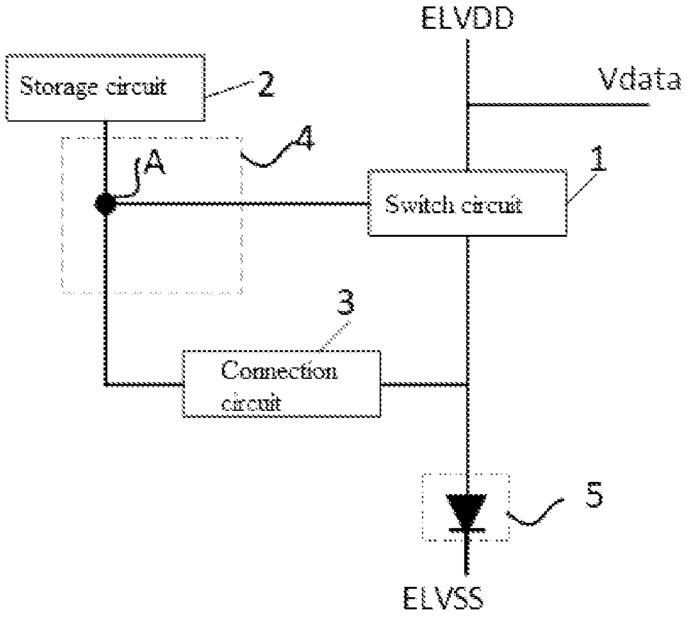
FIG. 1 is a schematic diagram of the basic structure of a pixel drive circuit provided by an embodiment of the present application.
Figure 2:
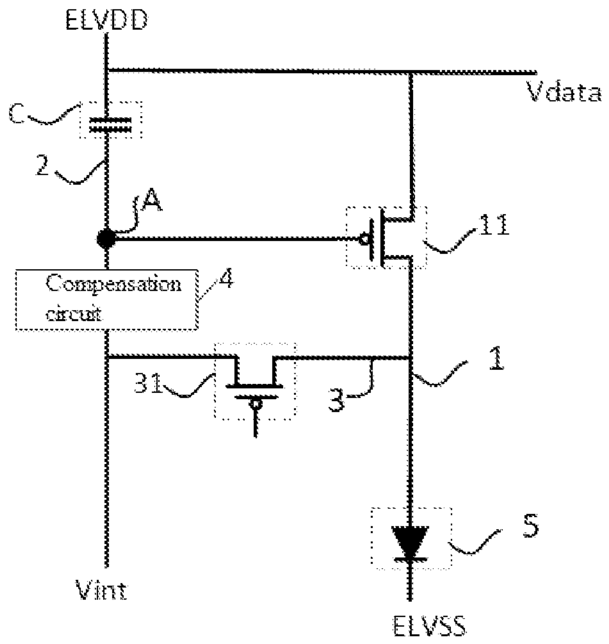
FIG. 2 is a schematic diagram of the basic structure of an optional pixel drive circuit provided by an embodiment of the present application.

FIG. 1 is a pixel drive circuit provided by an embodiment of the present application, the pixel drive circuit includes: a switchcircuit 1, a storage circuit 2, a connection circuit 3 and a compensation circuit 4, wherein: the switch circuit 1 is provided with a drive switch 11 (as shown in FIG. 2), the control end of which is connected to the compensation circuit 4, the input end of the drive switch 11 is connected to the data line and the power supply voltage ELVDD, the output end of the drive switch 11 is connected to the connection circuit 3 and the pixel 5; the connection circuit 3 is connected to the compensation circuit 4 and is configured to transmit the data voltage Vdata to the storage circuit 2 when the switch circuit 1 transmits the data voltage Vdata output by the data line, and the storage circuit 2 is configured to output the data voltage Vdata to the control end of the drive switch 11 after receiving the data voltage Vdata, so that the drive switch 11 drives the pixel 5 to emit light according to the power supply voltage ELVDD; the compensation circuit 4 is configured to compensate the resistance from the data line to the control end of the drive switch 11, wherein the dotted line in FIG. 1 shows the area where the compensation circuit 4 can be provided in the pixel drive circuit, and does not mean that the position of the dotted line is the actual position of the compensation circuit 4.

It can be understood that, due to the different distances from the data lines to different pixel rows, the impedances from the data lines to each pixel row are different, and different impedances lead to different data voltages Vdata received by different pixel rows, which in turn leads to different currents flowing through the pixels 5 in different pixel rows, resulting in uneven display brightness of the display panel and affecting the display effect; for example, taking the first pixel row and the third pixel row as an example, the impedance of the data line to the third pixel row is greater than that to the first pixel row. Since the impedances are different, and the higher the impedance is, the lower the data voltage Vdata received by the control end of the drive switch 11 is, the data voltage Vdata received by the drive switch 11 corresponding to the pixel 5 in the first pixel row is greater than that corresponding to the pixel 5 in the third pixel row. Further, the current flowing through the drive switch 11 in the first pixel row is greater than the current flowing through the drive switch 11 corresponding to the pixel 5 in the third pixel row, and the current received by the pixel 5 in the first pixel row is greater than that received by the pixel 5 in the third pixel row. That is, the display brightness of the pixel 5 in the first pixel row is greater than the display brightness of the pixel 5 in the third pixel row.

It should be understood that, as shown in FIG. 1, wherein the data voltage Vdata passes through the switch circuit and moves to the connection circuit 3, and through which it should move to the storage circuit 2. When the switch circuit 1 stops transmitting the data voltage Vdata, the storage circuit 2 releases the stored data voltage Vdata to the drive switch 11 of the drive switch 11, the compensation circuit 4 can be provided in multiple positions to achieve the effect of reducing the data voltage Vdata, thereby reducing the data voltage Vdata received by the drive switch 11, wherein, the specific location of the compensation circuit 4 will be described in detail below, and will not be repeated here. Specifically, assuming that the impedance between the data line Driver IC and the drive switch 11 of the pixel 5 in the farthest pixel row is Rt, the impedance is set to be a fixed value, so Rf+Ren+Rsub=Rt is a fixed value, Rf is a fanout wiring impedance, Rsub is the impedance of the data voltage Vdata passing through the path when charging the storage circuit 2, and Ren is the impedance value between the data line and the pixel 5 in the farthest pixel row; based on the impedance Rt of the pixel 5 in the farthest pixel row, and taking the pixel 5 in the first pixel row closest to the driver IC end as an example, a compensation circuit 4 is added to the pixel drive circuit corresponding to the pixel 5 in the first pixel row, the resistance of the compensation circuit 4 is Rc1. In order to make the resistance value from the data line to the pixel 5 in the last pixel row tend to be the same as the resistance value to the pixel 5 in the first pixel row, at this time, the resistance of the compensation circuit 4 meets Rf+Ren+Rsub=Rf+Re1+Rsub+Rc1, it can be seen that Rc1=Ren−Re1. As a result, the pixel drive circuit corresponding to the pixel 5 in the first pixel row increases the resistance value between the data line and the control end of the drive switch 11 through the added compensation circuit 4, then reducing the step-down compensation for the data voltage Vdata received by the control end of the drive switch 11 is implemented.

Wherein, the above-mentioned compensation circuit 4 is configured to compensate the resistance value from the data line to the control end of the drive switch 11, so that the resistance value from the data line to the control end of the drive switch 11 in different pixel rows tends to be consistent, achieving the effect that the efficiency of the same data line when charging the pixel 5 in pixel row at the far end is consistent with that at the near end, which can make the overall display brightness of the display panel more even, and improve the brightness uniformity of the display panel and user experience, thereby avoiding the problems that the efficiency of the same data line charging the pixels 5 in the pixel row at the far end is lower than that at the near end, causing uneven display brightness of the display panel and affecting the display effect.

In some examples of this embodiment, the pixel drive circuit includes: a target connection node A, the connection circuit 3 is connected to the storage circuit 2 through the target connection node A, and the storage circuit 2 is connected to the control end of the drive switch 11 through the target connection node A.

In some examples of this embodiment, as shown in FIG. 2, the compensation circuit 4 is provided between the connection circuit 3 and the target connection node A; wherein, the compensation circuit 4 is configured to reduce the data voltage Vdata when the connection circuit 3 transmits the data voltage Vdata to the storage circuit 2, so as to compensate for the data voltage Vdata received by the control end of the drive switch 11. Specifically, a compensation circuit 4 is provided between the connection circuit 3 and the target connection node A, thereby increasing the resistance value between the connection circuit 3 and the target connection node A. The data voltage Vdata reaches the connection circuit 3 after passing through the drive switch 11, the data voltage Vdata output by the connection circuit 3 reaches the target connection node A after passing through the compensation circuit 4, wherein, the compensation circuit 4 itself has a resistance value, so that the data voltage Vdata after passing through the compensation circuit 4 becomes lower, and then after being transmitted to the storage circuit 2 through the target connection node A, the data voltage Vdata received by the storage circuit 2 decreases. Subsequently, the storage circuit 2 transmits the received stepped-down data voltage Vdata to the control end of the drive switch 11, thereby reducing the data voltage Vdata received by the control end of the drive switch 11, and implementing step-down compensation for the data voltage Vdata received by the control end of the drive switch 11.

Continuing with the above example, for example, taking the display panel including N pixel rows as an example, the resistance value from the data line to the first pixel row is RC1, the resistance value from the data line to the Nth pixel row is RCN, where RCN is greater than RC1. Therefore, the voltage value of the data voltage Vdata transmitted by the data line to the drive switch 11 corresponding to the pixel 5 in the last pixel row through the RCN is Y, and the voltage value of the data voltage Vdata transmitted by the data line to the drive switch 11 corresponding to the pixel 5 in the first pixel row through RC1 is X, where X is greater than Y. At this time, the compensation circuit 4 is provided in the pixel drive circuit of each pixel 5 in the first pixel row, and the compensation circuit 4 is provided between the connection circuit 3 and the target connection node A, the resistance value of the compensation circuit 4 plus RC1 tends to be consistent with RCN. At this time, the voltage value of the data voltage Vdata, when transmitted to the connection circuit 3 through the drive switch 11, is X, the connection circuit 3 outputs the data voltage Vdata having a voltage of X, which passes through the compensation circuit 4 which itself has a resistance value and thus performs step-down compensation for the data voltage Vdata having a voltage of X, such that the stepped-down voltage of the data voltage Vdata is Y, then, the data voltage Vdata having a voltage of Y is transmitted to the storage circuit 2 through the target connection node A, and the storage circuit 2 subsequently outputs the data voltage Vdata having a voltage of Y to the control end of the drive switch 11, then step-down compensation for the data voltage Vdata received by the control end of the drive switch 11 is implemented, such that the data voltage Vdata of the drive switch 11 corresponding to the pixel 5 in the first pixel row and the data voltage Vdata of the drive switch 11 corresponding to the pixel 5 in the last pixel row tend to be the same. Further, the currents flowing through the pixels 5 in the last pixel row and the first pixel row tend to be the same, achieving the effect that the efficiency of the same data line when charging the pixels 5 in the pixel row at the far end is consistent with that at the near end, which can make the overall display brightness of the display panel more even, improve the brightness uniformity of the display panel and user experience, and avoid the problems that the efficiency of the same data line charging the pixels 5 in the pixel row at the far end is lower than that at the near end, resulting in uneven display brightness of the display panel and affecting the display effect.

Figure 3:
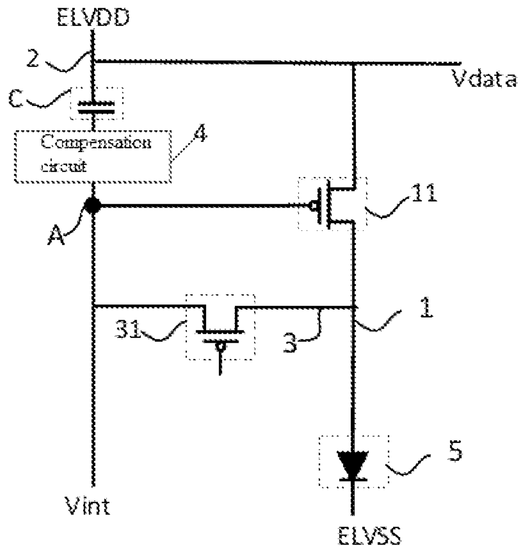
FIG. 3 is a schematic diagram of the basic structure of an optional pixel drive circuit provided by an embodiment of the present application.

In some examples of this embodiment, as shown in FIG. 3, the compensation circuit 4 is provided between the target connection node A and the storage circuit 2, wherein, the compensation circuit 4 is configured to reduce the data voltage Vdata when the connection circuit 3 transmits the data voltage Vdata to the storage circuit 2, so as to perform step-down compensation for the data voltage Vdata received by the control end of the drive switch 11; the compensation circuit 4 is further configured to reduce the data voltage Vdata when the storage circuit 2 outputs the data voltage Vdata, so as to perform step-down compensation for the data voltage Vdata received by the control end of the drive switch 11. Specifically, a compensation circuit 4 is provided between the target connection node A and the storage circuit 2, thereby increasing the resistance value between the storage circuit 2 and the target connection node A. The data voltage Vdata reaches the connection circuit 3 after passing through the drive switch 11, and the data voltage Vdata output by the connection circuit 3 reaches the compensation circuit 4 through the target connection node A, wherein, the compensation circuit 4 itself has a resistance value, thereby reducing the data voltage Vdata after passing through the compensation circuit 4. After the compensation circuit 4 transmits the reduced data voltage Vdata to the storage circuit 2, the data voltage Vdata received by the storage circuit 2 decreases. Subsequently, the storage circuit 2 transmits the received stepped-down data voltage Vdata to the control end of the drive switch 11, thereby reducing the data voltage Vdata received by the control end of the drive switch 11, thus step-down compensation for the data voltage Vdata received by the control end of the drive switch 11 is implemented.

Continuing with the above example, for example, taking the display panel including N pixel rows as an example. The resistance value from the data line to the first pixel row is RC1, and the resistance value from the data line to the Nth pixel row is RCN, where RCN is greater than RC1. Therefore, the voltage value of the data voltage Vdata transmitted by the data line to the drive switch 11 corresponding to the pixel 5 in the last pixel row through the RCN is Y, the voltage value of the data voltage Vdata transmitted by the data line to the drive switch 11 corresponding to the pixel 5 in the first pixel row through RC1 is X, where X is greater than Y. At this time, the compensation circuit 4 is provided in the pixel drive circuit of each pixel 5 in the first pixel row, and is provided between the storage circuit 2 and the target connection node A. The resistance value of the compensation circuit 4 plus RC1 is close to RCN. At this time, when the data voltage Vdata is transmitted to the connection circuit 3 through the drive switch 11, the voltage value is X, and the connection circuit 3 transmits the data voltage Vdata having a voltage of X to the compensation circuit 4 through the target connection node A. Since the compensation circuit 4 itself has a resistance value, it will perform step-down compensation for the data voltage Vdata having a voltage of X, such that the voltage of the stepped-down data voltage Vdata is Z, wherein the data voltage Vdata having a voltage of Z is transmitted to the storage circuit 2 which subsequently outputs the data voltage Vdata having a voltage of Z to the compensation circuit 4 that performs again step-down compensation for the data voltage Vdata having a voltage of Z, such that the voltage of the stepped-down data voltage Vdata is Y. Then, the data voltage Vdata having a voltage of Y is transmitted to the control end of the drive switch 11, implementing step-down compensation for the data voltage Vdata received by the control end of the drive switch 11. As a result, the data voltage Vdata of the drive switch 11 corresponding to the pixel 5 in the first pixel row and the data voltage Vdata of the drive switch 11 corresponding to the pixel 5 in the last pixel row tend to be the same. Further, the currents flowing through the pixel 5 in the last pixel row and the first pixel row tend to be the same, achieving the effect that the efficiency of the same data line when charging the pixels 5 in the pixel row at the far end is consistent with that at the near end, which can make the overall display brightness of the display panel more even, improve the brightness uniformity of the display panel and user experience, and avoid the problems that the efficiency of the same data line charging the pixels 5 in the pixel row at the far end is lower than that at the near end, resulting in uneven display brightness of the display panel and affecting the display effect.

Figure 4:
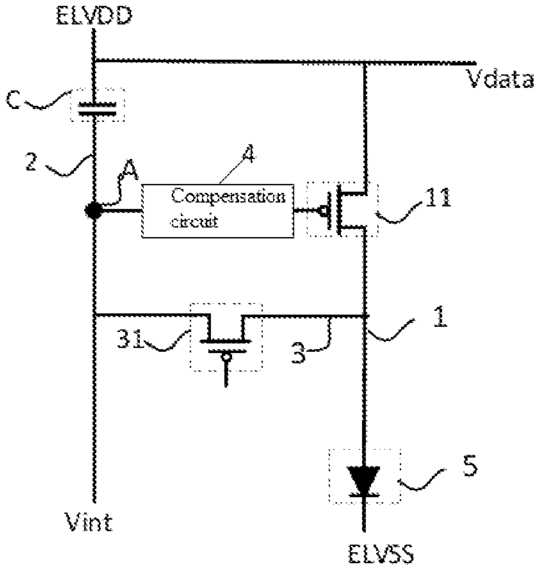
FIG. 4 is a schematic diagram of the basic structure of an optional pixel drive circuit provided by an embodiment of the present application.

In some examples of this embodiment, as shown in FIG. 4, the compensation circuit 4 is provided between the target connection node A and the control end of the drive switch 11, wherein the compensation circuit 4 is configured to reduce the data voltage Vdata when the storage circuit 2 outputs the data voltage Vdata to perform step-down compensation for the data voltage Vdata received by the control end of the drive switch 11. Specifically, a compensation circuit 4 is provided between the control end of the drive unit and the target connection node A, thereby increasing the resistance value between the control end of the drive unit and the target connection node A. The data voltage Vdata reaches the connection circuit 3 after passing through the drive switch 11, and the data voltage Vdata output by the connection circuit 3 reaches the storage circuit 2 after passing through the target connection node A, and the storage circuit 2 transmits the received data voltage Vdata to the drive switch 11 through the target node the control end. Since the compensation circuit 4 which itself has a resistance value is provided between the target node and the control end of the drive switch 11, so that the data voltage Vdata after passing through the compensation circuit 4 becomes lower, and the compensation circuit 4 transmits the reduced data voltage Vdata to the control end of the drive switch 11, implementing step-down compensation for the data voltage Vdata received by the control end of the drive switch 11.

Continuing with the above example, for example, taking the display panel including N pixel rows as an example. The resistance value from the data line to the first pixel row is RC1, and the resistance value from the data line to the Nth pixel row is RCN, where RCN is greater than RC1. Therefore, the voltage value of the data voltage Vdata transmitted by the data line to the drive switch 11 corresponding to the pixel 5 in the last pixel row through the RCN is Y, the voltage value of the data voltage Vdata transmitted by the data line to the drive switch 11 corresponding to the pixel 5 in the first pixel row through RC1 is X, where X is greater than Y. At this time, the compensation circuit 4 is provided in the pixel drive circuit of each pixel 5 in the first pixel row, and it is also provided between the control end of the drive switch 11 and the target connection node A. The resistance value of the compensation circuit 4 plus RC1 is close to RCN. At this time, when the data voltage Vdata is transmitted to the connection circuit 3 through the drive switch 11, the voltage value is X. The connection circuit 3 outputs the data voltage Vdata having a voltage of X which will be transmitted to the storage circuit 2 through the target connection node A, wherein the storage circuit 2 subsequently outputs the data voltage Vdata having a voltage of X to the control end of the drive switch 11. Since the compensation circuit 4 which itself has a resistance value is provided between the target node and the control end of the drive switch 11, the compensation circuit 4 performs step-down compensation for the data voltage Vdata having a voltage of X, such that the stepped-down data voltage Vdata is Y, then the data voltage Vdata having a voltage of Y is transmitted to the control end of the drive switch 11, implementing the step-down compensation for the data voltage Vdata received by the control end of the drive switch 11. As a result, the data voltage Vdata of the drive switch 11 corresponding to the pixel 5 in the first pixel row and the data voltage Vdata of the drive switch 11 corresponding to the pixel 5 in the last pixel row tend to be the same. Further, the currents flowing through the pixels 5 in the last pixel row and the first pixel row tend to be the same, achieving the effect that the efficiency of the same data line when charging the pixel 5 in the pixel row at the far end is consistent with that at the near end, which can make the overall display brightness of the display panel more even, improve the brightness uniformity of the display panel and user experience, and avoid the problems that the efficiency of the same data line charging the pixels 5 in the pixel row at the far end is lower than that at the near end, resulting in uneven display brightness of the display panel and affecting the display effect.

It should be understood that, in some examples, the compensation circuit 4 is provided between the connection circuit 3 and the target connection node A. Meanwhile, the compensation circuit 4 is provided between the target connection node A and the storage circuit 2, and it also is provided between the target connection node A and the control end of the drive switch 11. That is, the compensation circuit 4 is provided at the above three places at the same time, so as to increase the resistance value from the data line to the control end of the drive switch 11.

In some examples of this embodiment, the compensation circuit 4 includes a resistor and/or an extension wire. Specifically, the resistors include but are not limited to: variable resistors, fixed resistors; when the compensation circuit 4 is an extension wire, it includes at least one of the following functions: extending the distance between the connection circuit 3 and the target node; extending the distance from the storage circuit 2 to the target connection node A; extending the distance from the target connection node A to the control end of the drive switch 11.

As shown in any one of FIGS. 2-4, the drive switch is a thin film transistor. It can be understood that this embodiment does not limit the type of thin film transistor, and each thin film transistor described in this embodiment may be a P-type thin-film-transistor (P-type TFT) or N-type thin-film-transistor (N-type TFT); meanwhile, the thin film transistor provided in this embodiment can be manufactured by using but not limited to low temperature polysilicon (LTPS), amorphous silicon (a-Si) or amorphous indium gallium tin oxide (a-IGZO) thin film transistor (TFT) process technology.

In some examples of this embodiment, the connection circuit 3 is provided with a first thin film transistor 31, the input end of which is connected to the output end of the drive switch 11; the output end of the first thin film transistor is connected to the target connection node A; the storage circuit 2 is provided with a storage capacitor c which is configured to store the received data voltage Vdata when the connection circuit 3 transmits the data voltage Vdata. The storage capacitor c is also configured to output the data voltage Vdata to the control end of the drive switch 11 when the connection circuit 3 stops transmitting the data voltage Vdata and stores the received data voltage Vdata itself.

The pixel drive circuit provided in this embodiment includes: a switch circuit 1, a storage circuit 2, a connection circuit 3 and a compensation circuit 4, wherein, the switch circuit 1 is provided with a drive switch 11 whose control end is connected to the compensation circuit 4. The input end of the drive switch 11 is connected to the data line and the power supply voltage ELVDD, and the output end of the drive switch 11 is connected to the connection circuit 3 and the pixel 5; the connection circuit 3 is connected to the compensation circuit 4, and the connection circuit 3 is configured to transmit the data voltage Vdata to the storage circuit 2 when the switch circuit 1 transmits the data voltage Vdata output by the data line. The storage circuit 2 is configured to output the data voltage Vdata to the control end of the drive switch 11 after receiving the data voltage Vdata, so that the drive switch 11 drives the pixel 5 to emit light according to the power supply voltage ELVDD; the compensation circuit 4 is configured to compensate the resistance from the data line to the control end of the drive switch 11. Wherein, the above-mentioned compensation circuit 4 is configured to compensate the resistance value from the data line to the control end of the drive switch 11, so that the resistances value from the data line to the control end of the drive switch 11 in different pixel rows tend to be consistent, achieving the effect that the efficiency of the same data line when charging the pixel 5 in the pixel row at the far end is consistent with that at the near end, which can make the display brightness of the pixels in the pixel row more even. When the display brightness of the pixels in the pixel row is more even, the overall display brightness of the display panel can be made more even, thereby improving the brightness uniformity of the display panel and user experience and avoiding the problems that the efficiency of the same data line charging the pixels 5 in the pixel row at the far end is lower than that at the near end, resulting in uneven display brightness of the display panel and affecting the display effect.

Another Embodiment

Figure 5:
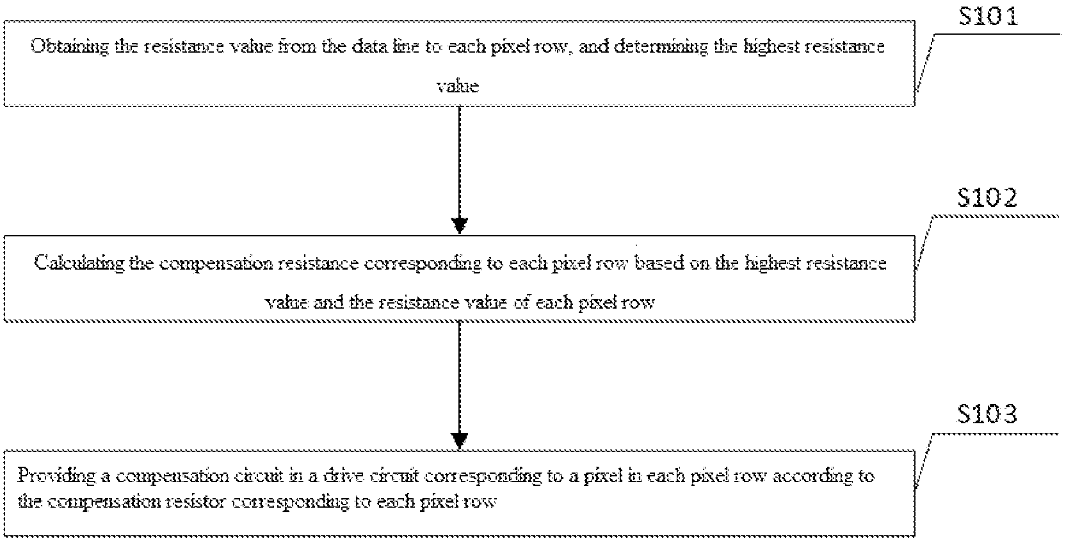
FIG. 5 is a basic schematic diagram of a resistance compensation method provided by another embodiment of the present application.

Based on the same concept, this embodiment provides a resistance compensation method, as shown in FIG. 5, the resistance compensation method includes:

S101. Obtaining the resistance value from the data line to each pixel row, and determining the highest resistance value;

S102. Calculating the compensation resistance corresponding to each pixel row based on the highest resistance value and the resistance value of each pixel row; and S103. According to the compensation resistor corresponding to each pixel row, providing a compensation circuit in a drive circuit corresponding to a pixel in each pixel row.

In some examples of this embodiment, the compensation circuit 4 is set in the drive circuit corresponding to the pixel 5 in each pixel row, including:

providing the compensation circuit 4 between the connection circuit 3 of the drive circuit corresponding to each pixel 5 and the target connection node A; and/or providing the compensation circuit 4 between the target connection node A of the drive circuit corresponding to each pixel 5 and the storage circuit 2; and/or providing the compensation circuit 4 between the target connection node A of the drive circuit corresponding to each pixel 5 and the control end of the drive switch 11.

Wherein, the pixel drive circuit includes: a switch circuit 1, a storage circuit 2, a connection circuit 3 and a compensation circuit 4, wherein, the switch circuit 1 is provided with a drive switch 11 whose control end is connected to the compensation circuit 4. The input end of the drive switch 11 is connected to the data line and the power supply voltage ELVDD, and the output end of the drive switch 11 is connected to the connection circuit 3 and the pixel 5; the connection circuit 3 is connected to the compensation circuit 3 and the circuit 4. The connection circuit 3 is configured to transmit the data voltage Vdata to the storage circuit 2 when the switch circuit 1 transmits the data voltage Vdata output by the data line, and the storage circuit 2 is configured to output the data voltage Vdata to the control end of the drive switch 11 after receiving the data voltage Vdata, so that the drive switch 11 drives the pixel 5 to emit light according to the power supply voltage ELVDD; the compensation circuit 4 is configured to compensate the resistance from the data line to the control end of the drive switch 11.

It can be understood that, due to the different distances from the data lines to different pixel rows, the impedances from the data lines to each pixel row are different, and the different impedances lead to different data voltages Vdata received by different pixel rows, which in turn makes the currents flowing through the pixels 5 in different pixel rows different, resulting in uneven display brightness of the display panel and affecting the display effect; for example, taking the first pixel row and the third pixel row as an example, the impedance of the data line to the third pixel row is greater than that to the first pixel row. Since the impedances are different, and the greater the impedance, the lower the data voltage Vdata received by the control end of the drive switch 11, as a result, the data voltage Vdata received by the drive switch 11 corresponding to the pixel 5 in the first pixel row is greater than the data voltage Vdata received by the drive switch 11 corresponding to the pixel 5 in the third pixel row. Further, the current flowing through the drive switch 11 in the first pixel row is greater than the that flowing through the drive switch 11 corresponding to the pixel 5 in the third pixel row, and the current received by the pixels 5 in the first pixel row is greater than the current received by the pixels 5 in the third pixel row, that is, the display brightness of the pixels 5 in the first pixel row is greater than the display brightness of the pixels 5 in the third pixel row.

It should be understood that the data voltage Vdata passes through the switch circuit 1 and moves to the connection circuit 3 through which it should move to the storage circuit 2. When the switch circuit 1 stops transmitting the data voltage Vdata, the storage circuit 2 releases the stored data voltage Vdata which then moves to the drive switch 11 of the drive switch 11. The compensation circuit 4 can be provided in multiple positions to achieve the effect of reducing the data voltage Vdata, thereby reducing the data voltage Vdata received by the drive switch 11. The specific position of the compensation circuit 4 will be described in detail later, and will not be repeated here. Specifically, assuming that the impedance between the data line Driver IC and the drive switch 11 of the pixel 5 in the farthest pixel row is Rt, the impedance is set to be a fixed value, so Rf+Ren+Rsub=Rt is a fixed value, Rf is a fanout wiring impedance, Rsub is the impedance of the data voltage Vdata passing through the path when charging the storage circuit 2, and Ren is the impedance value between the data line and the pixel 5 in the farthest pixel row; based on the impedance Rt of the pixel 5 in the farthest pixel row, and taking the pixel 5 in the first pixel row closest to the driver IC end as an example, a compensation circuit 4 whose resistance is Rc1 is added to the pixel drive circuit corresponding to the pixel 5 in the first pixel row. In order to make the resistance value from the data line to the pixel 5 in the last pixel row tend to be the same as the resistance value to the pixel 5 in the first pixel row, at this time, the resistance value of the compensation circuit 4 is determined by Rf+Ren+Rsub=Rf+Re1+Rsub+Rc1, it can be seen that Rc1=Ren-Re1. As a result, the pixel drive circuit corresponding to the pixel 5 in the first pixel row increases the resistance value between the data line and the control end of the drive switch 11 through the added compensation circuit 4, then reducing the step-down compensation for the data voltage Vdata received by the control end of the drive switch 11 is implemented.

Wherein, the above-mentioned compensation circuit 4 is configured to compensate the resistance value from the data line to the control end of the drive switch 11, so that the resistance values from the data line to the control end of the drive switch 11 in different pixel rows tend to be consistent, achieving the effect that the efficiency of the same data line when charging the pixel 5 in the pixel row at the far end is consistent with the efficiency at the near end, which can make the overall display brightness of the display panel more even, improve the brightness uniformity of the display panel and user experience, and avoid problems that the efficiency of the same data line charging the pixels 5 in the pixel row at the far end is lower than that at the near end, causing uneven display brightness of the display panel and affecting the display effect.

In some examples of this embodiment, the pixel drive circuit includes: a target connection node A, the connection circuit 3 is connected to the storage circuit 2 through the target connection node A, and the storage circuit 2 is connected to the control end of the drive switch 11 through the target connection node A.

In some examples of this embodiment, the compensation circuit 4 is provided between the connection circuit 3 and the target connection node A; when the compensation circuit 4 is configured to reduce the data voltage Vdata when the connection circuit 3 transmits the data voltage Vdata to the storage circuit 2, so as to perform step-down compensation for the data voltage Vdata received by the control end of the drive switch 11. Specifically, a compensation circuit 4 is provided between the connection circuit 3 and the target connection node A, thereby increasing the resistance value between the connection circuit 3 and the target connection node A. The data voltage Vdata reaches the connection circuit 3 after passing through the drive switch 11, the data voltage Vdata output by the connection circuit 3 reaches the target connection node A after passing through the compensation circuit 4, wherein the compensation circuit 4 itself has a resistance value, so that the data voltage Vdata after passing the compensation circuit 4 becomes lower, and then after being transmitted to the storage circuit 2 through the target connection node A, the data voltage Vdata received by the storage circuit 2 decreases. Subsequently, the storage circuit 2 transmits the received stepped-down data voltage Vdata to the control end of the drive switch 11, thereby reducing the data voltage Vdata received by the control end of the drive switch 11, and implementing step-down compensation for the data voltage Vdata received by the control end of the drive switch 11.

Continuing with the above example, for example, taking the display panel including N pixel rows as an example, the resistance value from the data line to the first pixel row is RC1, and the resistance value from the data line to the Nth pixel row is RCN, where RCN is greater than RC1. Therefore, the voltage value of the data voltage Vdata transmitted by the data line to the drive switch 11 corresponding to the pixel 5 in the last pixel row through the RCN is Y, the voltage value of the data voltage Vdata transmitted by the data line to the drive switch 11 corresponding to the pixel 5 in the first pixel row through RC1 is X, where X is greater than Y. At this time, the compensation circuit 4 is provided in the pixel drive circuit of each pixel 5 in the first pixel row, and the compensation circuit 4 is provided between the connection circuit 3 and the target connection node A, wherein the resistance value of the compensation circuit 4 plus RC1 is close to RCN. At this time, the voltage value of the data voltage Vdata, when transmitted to the connection circuit 3 through the drive switch 11, is X. The connection circuit 3 outputs the data voltage Vdata having a voltage of X, which passes through the compensation circuit 4 which itself has a resistance value and thus performs step-down compensation for the data voltage Vdata having a voltage of X, such that the stepped-down voltage of the data voltage Vdata is Y. Then, the data voltage Vdata having a voltage of Y is transmitted to the storage circuit 2 through the target connection node A, and the storage circuit 2 subsequently outputs the data voltage Vdata having a voltage of Y to the control end of the drive switch 11, then step-down compensation for the data voltage Vdata received by the control end of the drive switch 11 is implemented, such that the data voltage Vdata of the drive switch 11 corresponding to the pixel 5 in the first pixel row and the data voltage Vdata of the drive switch 11 corresponding to the pixel 5 in the last pixel row tend to be the same. Further, the current flowing through the pixels 5 in the last pixel row and the first pixel row tends to be the same, achieving the effect that the efficiency of the same data line when charging the pixels 5 in the pixel row at the far end is consistent with that at the near end, which can make the overall display brightness of the display panel more even, improve the brightness evenity of the display panel and user experience, and avoid problems that the efficiency of the same data line charging the pixels 5 in the pixel row at the far end is lower than that at the near end, causing uneven display brightness of the display panel and affecting the display effect.

In some examples of this embodiment, the compensation circuit 4 is provided between the target connection node A and the storage circuit 2, wherein the compensation circuit 4 is configured to reduce the data voltage Vdata when the connection circuit 3 transmits the data voltage Vdata to the storage circuit 2, so as to compensate the data voltage Vdata received by the control end of the drive switch 11; the compensation circuit 4 is further configured to reduce the data voltage Vdata when the storage circuit 2 outputs the data voltage Vdata, so as to compensate the data voltage Vdata received by the control end of the drive switch 11. Specifically, a compensation circuit 4 is provided between the target connection node A and the storage circuit 2, thereby increasing the resistance value between the storage circuit 2 and the target connection node A. The data voltage Vdata reaches the connection circuit 3 after passing through the drive switch 11, the data voltage Vdata output by the connection circuit 3 reaches the compensation circuit 4 through the target connection node A, wherein the compensation circuit 4 itself has a resistance value, thereby reducing the data voltage Vdata after passing through the compensation circuit 4. After the compensation circuit 4 transmits the stepped-down data voltage Vdata to the storage circuit 2, the data voltage Vdata received by the storage circuit 2 decreases, then the storage circuit 2 transmits the received stepped-down data voltage Vdata to the control end of the drive switch 11, which further reduces the data voltage Vdata received by the control end of the drive switch 11, therefore, step-down compensation for the data voltage Vdata received by the control end of the drive switch 11 is implemented.

Continuing with the above example, for example, taking the display panel including N pixel rows as an example, the resistance value from the data line to the first pixel row is RC1, and the resistance value from the data line to the Nth pixel row is RCN, where RCN is greater than RC1. Therefore, the voltage value of the data voltage Vdata transmitted by the data line to the drive switch 11 corresponding to the pixel 5 in the last pixel row through the RCN is Y, the voltage value of the data voltage Vdata transmitted by the data line to the drive switch 11 corresponding to the pixel 5 in the first pixel row through RC1 is X, where X is greater than Y. At this time, the compensation circuit 4 is provided in the pixel drive circuit of each pixel 5 in the first pixel row, and the compensation circuit 4 is provided between the connection circuit 2 and the target connection node A, wherein the resistance value of the compensation circuit 4 plus RC1 is close to RCN. At this time, the voltage value of the data voltage Vdata when transmitted to the connection circuit 3 through the drive switch 11 is X. The connection circuit 3 transmits the data voltage Vdata having a voltage of X to the compensation circuit 4 through the target connection node A. The compensation circuit 4 itself has a resistance value, and performs step-down compensation for the data voltage Vdata having a voltage of X, so that the voltage of stepped-down data voltage Vdata is Z, wherein the data voltage Vdata having a voltage of Z is transmitted to the storage circuit 2 which subsequently outputs the data voltage Vdata having a voltage of Z to the compensation circuit 4 that performs again step-down compensation for the data voltage Vdata having a voltage of Z, such that the voltage of the data voltage Vdata is Y. Then the data voltage Vdata having a voltage of Y is transmitted to the control end of the drive switch 11, implementing step-down compensation for the data voltage Vdata received by the control end of the drive switch 11. As a result, the data voltage Vdata of the drive switch 11 corresponding to the pixel 5 in the first pixel row and the data voltage Vdata of the drive switch 11 corresponding to the pixel 5 in the last pixel row tend to be the same. Further, the current flowing through the pixels 5 in the last pixel row and the first pixel row tends to be the same, achieving the effect that the efficiency of the same data line when charging the pixels 5 in the pixel row at the far end is consistent with that at the near end, which can make the overall display brightness of the display panel more even, improve the brightness evenity of the display panel and user experience, and avoid problems that the efficiency of the same data line charging the pixels 5 in the pixel row at the far end is lower than that at the near end, causing uneven display brightness of the display panel and affecting the display effect.

In some examples of this embodiment, the compensation circuit 4 is provided between the target connection node A and the control end of the drive switch 11, wherein the compensation circuit 4 is configured to reduce the data voltage Vdata when the storage circuit 2 outputs the data voltage Vdata, so as to compensate the data voltage Vdata received by the control end of the drive switch 11. Specifically, a compensation circuit 4 is provided between the control end of the drive unit and the target connection node A, thereby increasing the resistance value between the control end of the drive unit and the target connection node A. The data voltage Vdata reaches the connection circuit 3 after passing through the drive switch 11, the data voltage Vdata output by the connection circuit 3 reaches the storage circuit 2 after passing through the target connection node A, the storage circuit 2 transmits the received data voltage Vdata to the control end of the drive switch 11 through the target node. Since the compensation circuit 4 which itself has a resistance value is provided between the target node and the control end of the drive switch 11, so that the data voltage Vdata after passing through the compensation circuit 4 becomes lower. The compensation circuit 4 transmits the reduced data voltage Vdata to the control end of the drive switch 11, so as to implement step-down compensation for the data voltage Vdata received by the control end of the drive switch 11.

Continuing with the above example, for example, taking the display panel including N pixel rows as an example, the resistance value from the data line to the first pixel row is RC1, and the resistance value from the data line to the Nth pixel row is RCN, where RCN is greater than RC1. Therefore, the voltage value of the data voltage Vdata transmitted by the data line to the drive switch 11 corresponding to the pixel 5 in the last pixel row through the RCN is Y, the voltage value of the data voltage Vdata transmitted by the data line to the drive switch 11 corresponding to the pixel 5 in the first pixel row through RC1 is X, where X is greater than Y. At this time, the compensation circuit 4 is provided in the pixel drive circuit of each pixel 5 in the first pixel row, and the compensation circuit 4 is provided between the control end of the drive switch 11 and the target connection node A, wherein the resistance value of the compensation circuit 4 plus RC1 is close to RCN. At this time, the voltage value of the data voltage Vdata when transmitted to the connection circuit 3 through the drive switch 11 is X. The connection circuit 3 outputs the data voltage Vdata having a voltage of X and transmits it to the storage circuit 2 through the target connection node A, and the storage circuit 2 subsequently outputs the data voltage Vdata having a voltage of X to the control end of the drive switch 11. Since the compensation circuit 4 which itself has a resistance value is provided between the target node and the control end of the drive switch 11, it performs step-down compensation for the data voltage Vdata having a voltage of X, thereby reducing the voltage of stepped-down data voltage Vdata to Y, and then the data voltage Vdata having a voltage Y is transmitted to the control end of the drive switch 11, further, step-down compensation for the data voltage Vdata received by the control end of the drive switch 11 is implemented. As a result, the data voltage Vdata of the drive switch 11 corresponding to the pixel 5 in the first pixel row and the data voltage Vdata of the drive switch 11 corresponding to the pixel 5 in the last pixel row tend to be the same. Further, the current flowing through the pixels 5 in the last pixel row and the first pixel row tends to be the same, achieving the effect that the efficiency of the same data line when charging the pixels 5 in the pixel row at the far end is consistent with that at the near end, which can make the overall display brightness of the display panel more even, improve the brightness uniformity of the display panel and user experience, and avoid problems that the efficiency of the same data line charging the pixels 5 in the pixel row at the far end is lower than that at the near end, causing uneven display brightness of the display panel and affecting the display effect.

It should be understood that, in some examples, the compensation circuit 4 is disposed between the connection circuit 3 and the target connection node A. Meanwhile, the compensation circuit 4 is disposed between the target connection node A and the storage circuit 2, and the compensation circuit 4 is disposed between the target connection node A and the control end of the drive switch 11. That is, the compensation circuit 4 is provided at the above three places at the same time, so as to increase the resistance value from the data line to the control end of the drive switch 11.

In some examples of this embodiment, the compensation circuit 4 includes a resistor and/or an extension wire. Specifically, the resistors include but are not limited to: variable resistors, fixed resistors; when the compensation circuit 4 is an extension wire, it includes at least one of the following functions: configured to extend the distance between the connection circuit 3 and the target node; extend the distance from the storage circuit 2 to the target connection node A; extend the distance from the target connection node A to the control end of the drive switch 11.

In some examples of this embodiment, the connection circuit 3 is provided with a first thin film transistor, the input end of the first thin film transistor is connected to the output end of the drive switch 11; the output end of the first thin film transistor is connected to the target connection node A; the storage circuit 2 is provided with a storage capacitor which is configured to store the received data voltage Vdata when the connection circuit 3 transmits the data voltage Vdata. The storage capacitor is also configured to output the data voltage Vdata to the control end of the drive switch 11 when the connection circuit 3 stops transmitting the data voltage Vdata and stores the received data voltage Vdata itself.

In some examples, the first thin film transistor is an N-type thin film transistor. In some examples, the first thin film transistor is a P-type thin film transistor. It can be understood that this embodiment does not limit the type of thin film transistors, and each thin film transistor described in this embodiment may be a P-type thin-film-transistor (P-type TFT) or an N-type thin-film-transistor (N-type TFT); at the same time, the thin film transistor provided in this embodiment can be manufactured by using, but not limited to low temperature polysilicon (LTPS), amorphous silicon (a-Si) or amorphous indium gallium tin oxide (a-IGZO) thin film transistor (TFT) process technology.

In the resistance compensation method provided in this embodiment, by providing the compensation circuit 4, the above-mentioned compensation circuit 4 is configured to compensate the resistance value from the data line to the control end of the drive switch 11, so that the resistance values of the data lines to the control ends of the drive switches 11 in different pixel rows tends to be consistent, thus achieving the effect that the efficiency of the same data line when charging the pixel 5 in the pixel row at the far end is consistent with that at the near end, which can make the display brightness of the pixels in the pixel row more even. When the pixel display brightness of multiple pixel rows is more even, the overall display brightness of the display panel can be made more even, thereby improving the brightness uniformity and user experience of the display panel, and avoiding problems that the efficiency of the same data line charging the pixels 5 in the pixel row at the far end is lower than that at the near end, causing uneven display brightness of the display panel and affecting the display effect.

Another Embodiment

Figure 6:
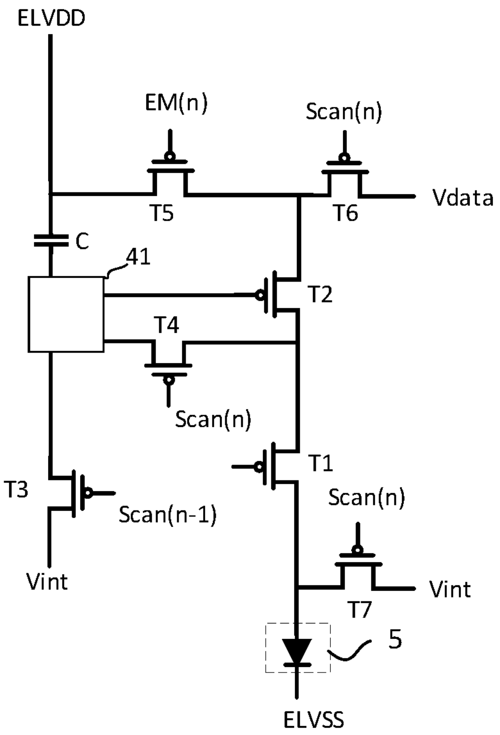
FIG. 6 is a schematic diagram of the basic structure of a pixel drive circuit provided by another embodiment of the present application.

In order to better understand the present application, this embodiment provides a more specific example for illustration;

taking the pixel drive circuit 7T1C structure in the display panel as an example, the pixel drive circuit of each pixel is shown in FIG. 6, that is, there are 7 TFTs and one C, wherein the display panel has multiple pixel rows, each data line is connected to multiple pixel rows, and the data line is fixed, that is, it must start from the IC, and the output data voltage of the data line flows as follows: starting from the IC→data line→T6→T2→T4, and finally stored in C and applied to T2 so as to control the amount of current through T2, and indirectly control the brightness of the OLED device. As wiring is from near to far, the difference in the wiring impedance of the data line between the far end and the near end must exist objectively, resulting in the difference between the resistance of the pixel drive switch control end in the pixel row at the near end and the resistance of the pixel drive switch control end in the pixel row at the far end, and resulting in the existence of display difference.

From the above description, it can be known that the pixel drive circuit corresponding to each pixel has a part of its own resistance, that is, starting from IC→data line→T6→T2→T4, and finally stored in C and applied to T2. If the impedance of the data line to the far-end pixel row can be matched with the impedance of the data line to the near-end on this path, the problem of display differences can be solved.

In particular, the section from T6 to T4 cannot be changed because the current provided by the ELVDD power supply needs to go through this path to reach the position of the OLED device, otherwise it will cause other display differences on the screen. But for the section from T4 to T2, it can be set differently according to the different pixels. Although the section from T3 to C also communicates with the section from T4 to T2, the VINT voltage herein is generally a constant voltage and it is not like the voltage on the data line varies depending on brightness and voltage value, nor is it as strict as the current accuracy requirement on the ELVDD path, as a result, the resistance value of this section can be different between different pixels.

Specifically, as shown in FIG. 6, a variable resistance area 41 is added between T4—T2 (the dotted line box in the figure shows the variable resistance area);

assuming that the impedance between the data line Driver IC and the T2 control end of the pixel in the furthest pixel row is Rt, this impedance is set as a fixed value, so Rf+Ren+Rsub=Rt is a fixed value, where Rf is the fanout area wiring impedance, Rsub is the impedance of the pixel data passing through the internal path of the pixel drive circuit when charging C, and Ren is the impedance value between the data line in the display area and the pixel in the furthest pixel row;

based on this impedance, taking the pixel in the pixel row closest to the Driver IC end as an example, a resistor Rc1 will be added to the variable resistance area in the pixel, as its resistance value Rf+Ren+Rsub=Rf+Re1+Rsub+Rc1, it can be seen that Rc1=Ren-Re1;

since Re1 is the impedance value between the data line in the display area and the pixels in the first pixel row, both of which are fixed values, Rc is fixed too;

the other rows are analogized in turn to obtain the impedance Rcm=Ren−Rem of the variable resistance area of each pixel row.

It can be seen that the smallest unit of the resistance value of the variable resistance area takes row as a unit. If the picture quality is acceptable, then multiple rows can be used as one resistance value, such as the first row & the second row, that is, two adjacent rows are the smallest unit, then Rc1=Rc2, or the first line~the xth line . . . as long as the display effect is acceptable.

There are means for realizing the resistance value (the following changes are made compared to other lines in the farthest line)

adding resistance Rcn directly in the variable resistance area;

increasing the length of the wires in the variable resistor area, and reducing the width/thickness of the wires taken by the variable resistors;

changing the material and using the material with a large resistivity;

wherein, in actual application, according to I=U/R, because the data lines of the farthest row and the closest row have the same impedance before reaching C, for the same data voltage, I can be the same. Since I=Q/t, the total amount of charge Q reaching C in the same time is the same, then charging efficiency is improved.

In particular, this method can also be used in other architectures, such as the 2T1C drive architecture. The key point is that when the data line is charging, an adjustable resistance area is added between the last switch and the storage capacitor, which cannot affect the current provided by ELVDD to the OLED. It must be ensured that the farthest and the nearest impedances are the same.

Another Embodiment

Figure 7:
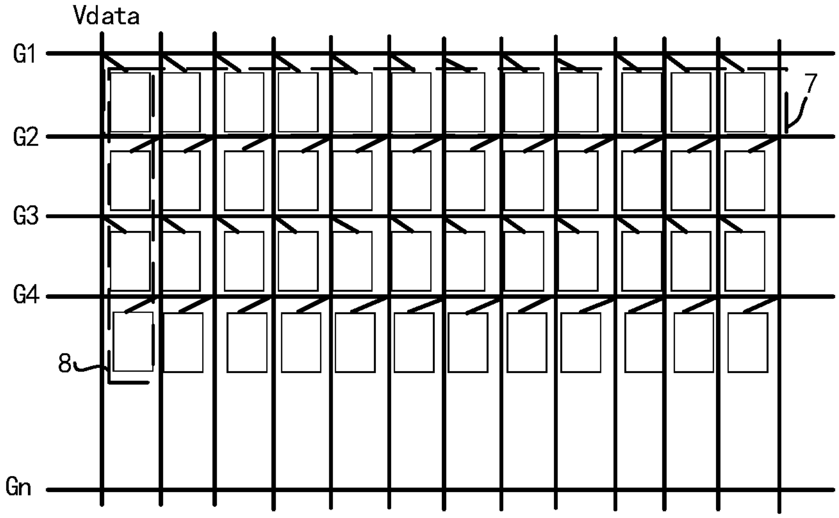
FIG. 7 is a basic schematic diagram of a display panel provided by another embodiment of the present application.

Based on the same idea, this embodiment provides a display panel. As shown in FIG. 7, the display panel includes: a plurality of pixel rows 7 and a plurality of pixel columns 8, each of the pixel rows 7 and the pixel columns 8 is composed of a plurality of pixels, and the pixels in at least one of the pixel rows 7 are driven to emit light by the pixel drive circuit described in any one of the above.

In some examples, the pixels include: red pixels, green pixels and blue pixels; or, the pixels include red pixels, green pixels, blue pixels and yellow pixels; or, the pixels include red light pixels, green light pixels, blue light pixels and white light pixels.

Another Embodiment

Figure 8:
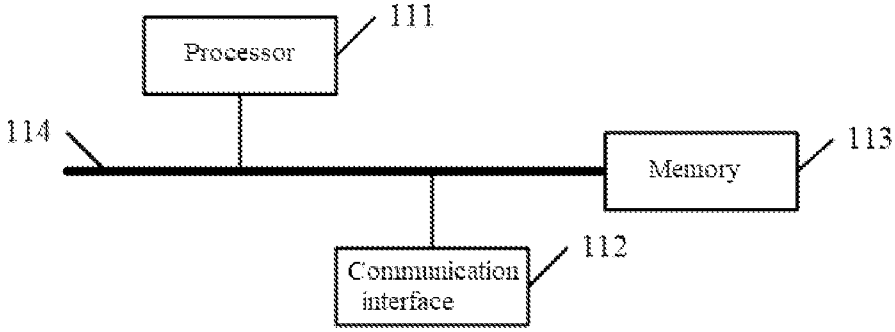
FIG. 8 is a schematic structural diagram of a display device provided by another embodiment of the present application.

As shown in FIG. 8, the embodiment of the present application provides a display device, which includes a processor 111, a communication interface 112, a memory 113, and a communication bus 114, wherein the processor 111, the communication interface 112, and the memory 113 communicate with each other via the communication bus 114, the memory 113 is configured to store computer programs;

in one embodiment of the present application, the processor 111 is configured to implement the steps of the resistance compensation method when executing the program stored in the memory 113. The resistance compensation method includes: obtaining the resistance value from the data line to each pixel row, and determining the highest resistance value;

a compensation resistance corresponding to each pixel row is calculated based on the highest resistance value and the resistance value of each pixel row;

a compensation circuit is provided in a drive circuit corresponding to a pixel in each pixel row according to the compensation resistor corresponding to each pixel row.

The embodiment of the present application also provides a computer-readable storage medium stored on a computer program which when executed by a processor, implements the steps of the resistance compensation method. The resistance compensation method includes: obtaining the resistance value from the data line to each pixel row, and determining the highest resistance value;

calculating a compensation resistance corresponding to each pixel row based on the highest resistance value and the resistance value of each pixel row;

providing a compensation circuit in a drive circuit corresponding to a pixel in each pixel row according to the compensation resistor corresponding to each pixel row.

It should also be noted that the term "comprise", "include" or any other variation thereof is intended to cover a non-exclusive inclusion such that a process, method, article, or apparatus comprising a set of elements includes not only those elements, but also other elements implicitly listed, or elements inherent in the process, method, commodity, or apparatus. Without further limitations, an element defined by the phrase "comprising a . . . " does not preclude the presence of additional identical elements in the process, method, article, or apparatus that includes the element.

The above are only examples of the present application, and are not intended to limit the present application. For those skilled in the art, various modifications and changes may occur in this application. Any modification, equivalent replacement, improvement, etc. made within the spirit and principle of the present application shall be included within the scope of the claims of the present application.

What is claimed is:

1. A pixel drive circuit, wherein the pixel drive circuit comprises: a switch circuit, a storage circuit, a connection circuit and a compensation circuit, wherein, the switch circuit is provided with a drive switch, a control end of the drive switch is connected to the compensation circuit, an input end of the drive switch is connected to a data line and a power supply voltage, and an output end of the drive switch is connected to the connection circuit and the pixel;

the connection circuit is connected to the compensation circuit, the connection circuit is configured to transmit the data voltage to the storage circuit when the switch circuit transmits the data voltage output by the data line, and the storage circuit is configured to output the data voltage to the control end of the drive switch after receiving the data voltage, so that the drive switch drives the pixel to emit light according to the power supply voltage; and the compensation circuit is configured to compensate the resistance from the data line to the control end of the drive switch.

2. The pixel drive circuit according to claim 1, wherein the pixel drive circuit comprises: a target connection node, the connection circuit is connected to the storage circuit through the target connection node, and the storage circuit is connected to the control end of the drive switch through the target connection node.

3. The pixel drive circuit according to claim 2, wherein the compensation circuit is provided between the connection circuit and the target connection node.

4. The pixel drive circuit according to claim 2, wherein the compensation circuit is provided between the target connection node and the storage circuit.

5. The pixel drive circuit according to claim 2, wherein the compensation circuit is provided between the target connection node and the control end of the drive switch.

6. The pixel drive circuit according to claim 2, wherein the compensation circuit comprises a resistor.

7. The pixel drive circuit according to claim 2, wherein the resistor comprises: a variable resistor or a fixed resistor.

8. The pixel drive circuit according to claim 2, wherein the compensation circuit comprises an extension wire.

9. The pixel drive circuit according to claim 2, wherein a first thin film transistor is provided on the connection circuit, and the input end of the first thin film transistor is connected to the output end of the drive switch; the output end of the first thin film transistor is connected to the target connection node.

10. The pixel drive circuit according to claim 2, wherein the drive switch is a thin film transistor.

11. The pixel drive circuit according to claim 2, wherein a storage capacitor is provided on the storage circuit.

12. A resistance compensation method, wherein the resistance compensation method comprises:

obtaining a resistance value from a data line to each pixel row, and determining a highest resistance value;

calculating a compensation resistance corresponding to each of the pixel rows based on the highest resistance value and the resistance value of each of the pixel rows; and providing a compensation circuit in a drive circuit corresponding to a pixel in each of the pixel rows according to the compensation resistor corresponding to each of the pixel rows.

13. The resistance compensation method according to claim 12, wherein a compensation circuit is provided in a drive circuit corresponding to a pixel in each of the pixel rows, comprising:

providing the compensation circuit between the connection circuit of the drive circuit corresponding to each of the pixels and the target connection node;

and/or providing the compensation circuit between the target connection node of the drive circuit corresponding to each of the pixels and the storage circuit; and/or providing the compensation circuit between the target connection node of the drive circuit corresponding to each of the pixels and the control end of the drive switch.

14. A display panel, wherein the display panel comprises: a plurality of pixel rows and a plurality of pixel columns, each of the pixel rows and the pixel columns is composed of a plurality of pixels, the pixels of the at least one pixel row are driven to emit light by a pixel drive circuit, and the pixel drive circuit includes: a switch circuit, a storage circuit, a connection circuit and a compensation circuit, wherein:

the switch circuit is provided with a drive switch, a control end of the drive switch is connected to the compensation circuit, an input end of the drive switch is connected to the data line and the power supply voltage, and an output end of the drive switch is connected to the connection circuit and the pixel;

the connection circuit is connected to the compensation circuit, the connection circuit is configured to transmit the data voltage to the storage circuit when the switch circuit transmits the data voltage output by the data line, and the storage circuit is configured to output the data voltage to the control end of the drive switch after receiving the data voltage, so that the drive switch drives the pixel to emit light according to the power supply voltage; and the compensation circuit is configured to compensate the resistance from the data line to the control end of the drive switch.

15. The display panel according to claim 14, wherein the pixels comprise: red pixels, green pixels and blue pixels; or, the pixels comprise red pixels, green pixels, blue pixels and yellow pixels; or, the pixels comprise red pixels, green pixels, blue pixels and white pixels.

* * * * *